Feb. 21, 1933.  A. PAPÖ ET AL  1,898,850
MOVING PICTURE MACHINE
Original Filed Nov. 12, 1924  3 Sheets-Sheet 1
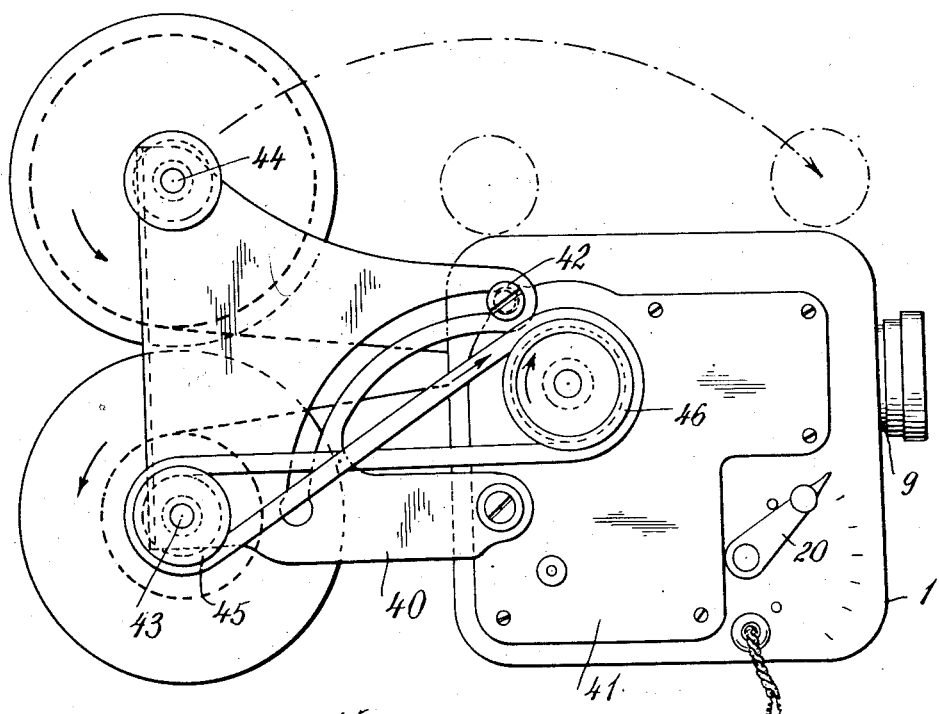
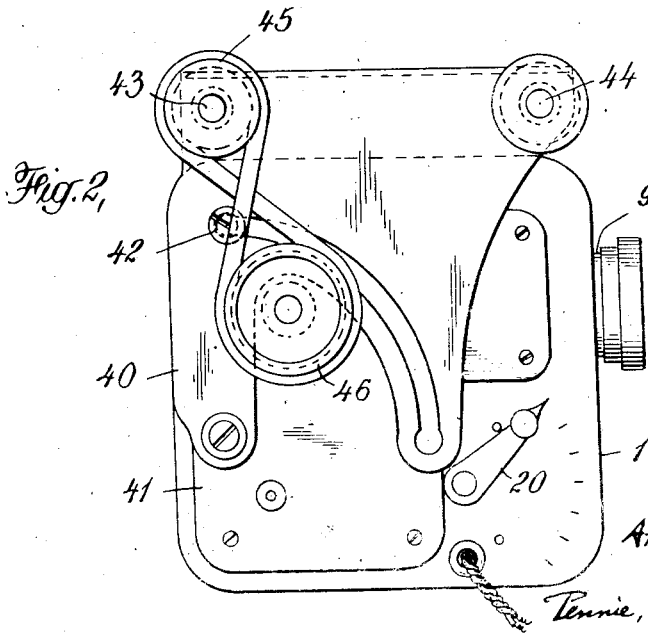
INVENTORS
Amando Papö
BY Augusto Gentilini
Pennie, Davis, Marvin & Edmonds
ATTORNEYS

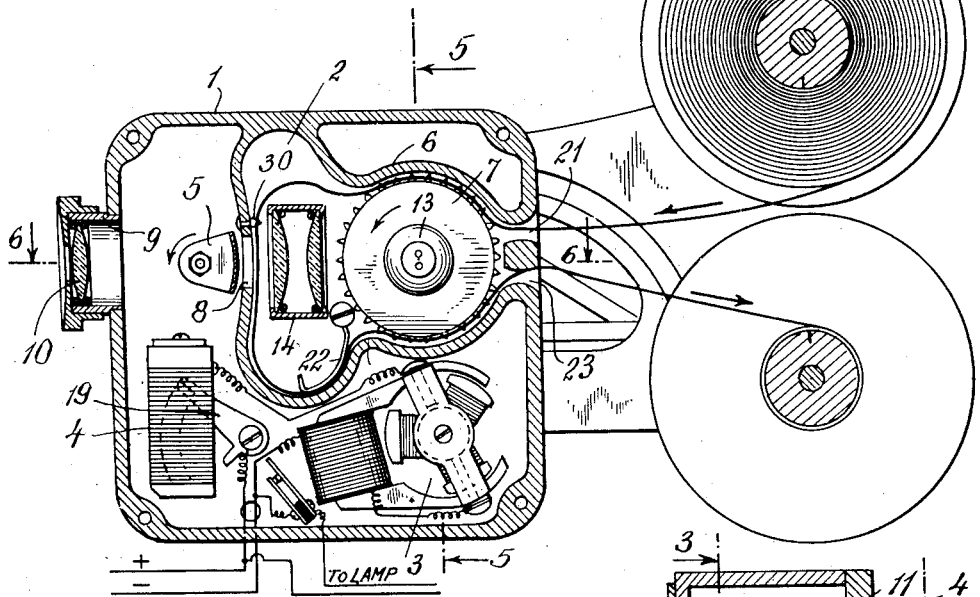
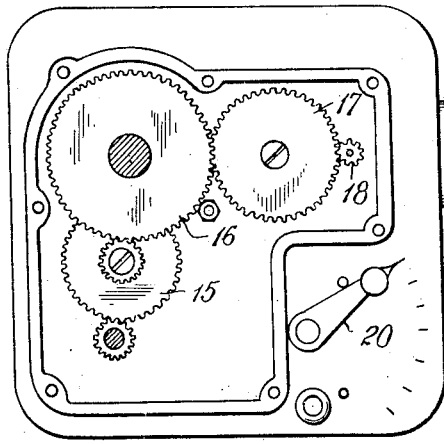
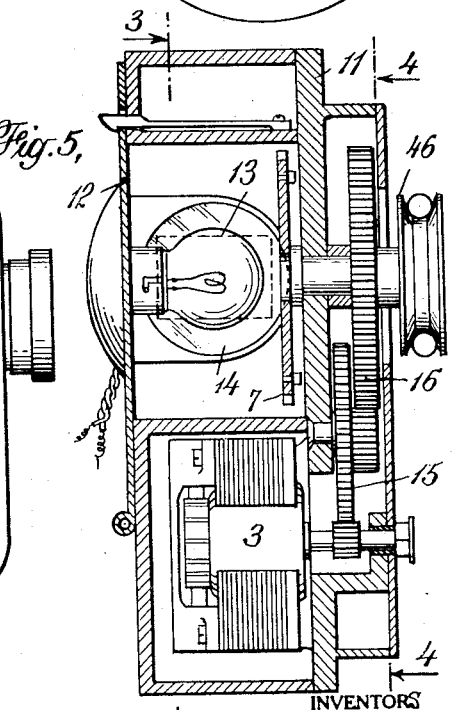

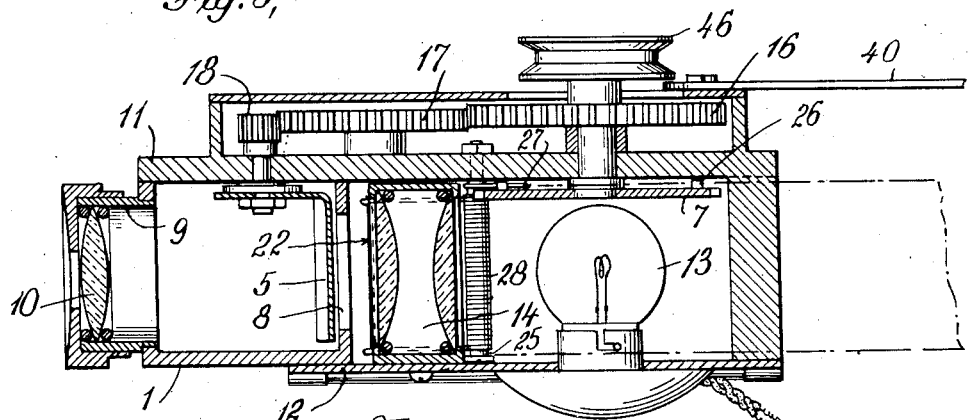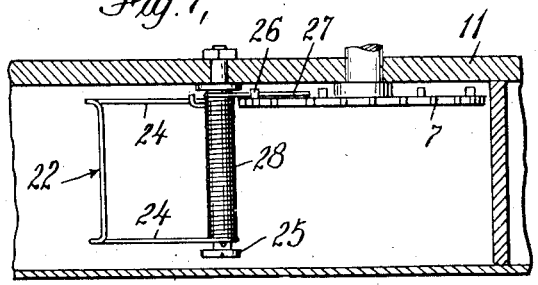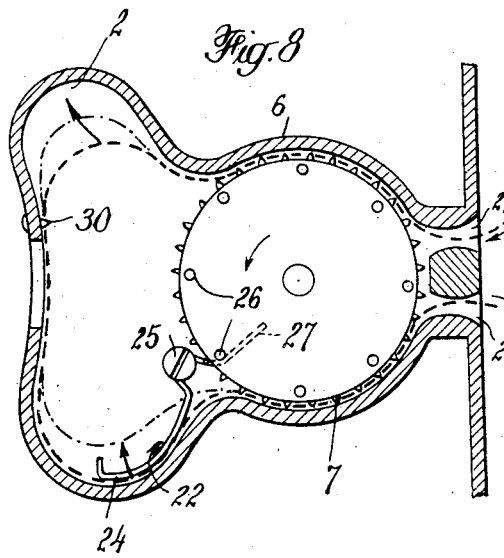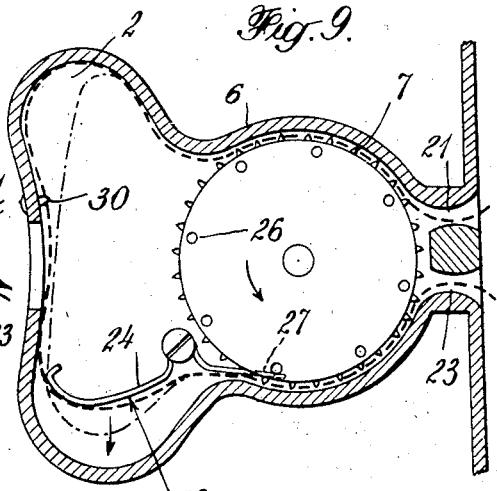

UNITED STATES PATENT OFFICE

ARMANDO PAPÖ AND AUGUSTO GENTILINI, OF ROME, ITALY

MOVING PICTURE MACHINE

Application filed November 12, 1924, Serial No. 749,409, and in Italy November 23, 1923. Renewed July 14, 1932.

This invention relates to moving picture machines and has for its object to provide a small, light machine of low manufacturing cost and simple construction, especially adapted for use as a "home projector" or for other non-professional use. This application is a continuation in part of the application by the same inventors, filed Mar. 12, 1924, Ser. No. 698,787.

The principal feature of our improved machine consists of a novel feed mechanism whereby the usual friction guides or "gate" for maintaining the picture stationary at the projection aperture during the interval of projection is dispensed with, the picture being held in position by the natural elasticity of the film pressing against the wall containing the aperture. By this construction the resistance to the movement of the film which is caused chiefly by the pressure of the film guides at the aperture is so greatly reduced that a very quick intermittent movement is employed without damage to the film.

Another principal feature of our improved machine is the use of a single feed sprocket for both the upper and the lower loop of the film, the same feed sprocket serving also to actuate the intermittent feed whereby the entire film feeding mechanism consists of but two moving parts.

A further feature of the invention consists in the provision of a novel film registering pin or tooth adjacent the aperture adapted to engage the sprocket holes in the margin of the film to thereby hold the film in fixed position with relation to the aperture during the interval of projection, thus insuring a stationary film at the aperture and also an exact registration of the successive pictures with the aperture.

Our improved machine also comprises various novel features in the construction and arrangement of the driving motor and the control therefor, and also the design and arrangement of the projecting lamp and lenses whereby a simple, compact machine is produced which may be connected with an ordinary lamp socket and held and operated with one hand, although using full size standard film.

In the accompanying drawings we have illustrated a preferred embodiment of our invention.

In said drawings:

Figure 1 is a side elevation showing the entire machine with the film reels adjusted for operation;

Fig. 2 is a similar view showing the reels in folded position;

Fig. 3 is a vertical sectional view on line 3—3 of Fig. 5 through the main compartment of the machine;

Fig. 4 is an elevational view on line 4—4 of Fig. 5, with the cover of the gear compartment removed.

Fig. 5 is a transverse sectional view on line 5—5 of Fig. 3;

Fig. 6 is a horizontal sectional view on line 6—6 of Fig. 3;

Fig. 7 is a detail view showing the intermittent film feeding mechanism; and

Figs. 8 and 9 are diagrammatic views showing successive steps in the film-feeding operation.

Referring to the drawings, particularly to Figs. 3 and 5, 1 represents the casing of the machine, preferably formed of a die casting of generally square outline containing a film-enclosing compartment 2 with its walls integral with the outer walls of the main rectangular compartment which contains the driving motor 3, rheostat and cut-off switch 4 and shutter 5.

The wall 6 which divides the film-containing compartment from the motor compartment is of the shape shown in Fig. 3, consisting essentially of a main circular rear portion conforming to the single feed sprocket 7 and upper and lower curved portions or lobes, for receiving the upper and lower loops of film. The wall of the compartment 2 intermediate the upper and lower loop-receiving portion is provided with a projection aperture 8, and in line with the projection aperture in the outer wall of the casing 1 is the lens tube 9 which supports the projecting lens 10.

One side wall of the main casing 1 is formed of a separate plate 11 on which there is supported the driving motor and rheostat, the shutter, film-feeding mechanism and the operating connections whereby when the plate 11 is removed from the casing the entire operating mechanism is removed with it.

The other side of the film-containing compartment 2 is closed by a door 12 hinged along its lower edge to the main casing 1 and mounted on the door are the projection lamp 13 and the condensers 14 whereby these parts are removed from the compartment when the door is opened to allow free access to the compartment for threading the film.

The film-feeding mechanism comprises a sprocket 7 which consists of a single disk having teeth on its periphery to conform with the sprocket holes in one margin of the film. For standard film the sprocket 7 will be provided with four teeth for each picture of the film, but for small film such as usually employed in home projectors, there will be but a single sprocket hole for each picture and the teeth of the disk will be arranged accordingly. The sprocket is driven continuously from the driving motor 3 through a train of reducing gears shown particularly in Fig. 4. These gears comprise an intermediate clock gear 15 whose pinion meshes with an idler 16 which in turn drives a gear 17 on the sprocket shaft. The gear 17 drives a pinion 18 on the shutter shaft, the ratio of the gear and pinion being such that for each movement of the sprocket shaft corresponding to four teeth of the sprocket the pinion 18 will be given a complete revolution. The speed of the driving motor is controlled through the rheostat 4 which, as shown, consists of a simple coil of resistance wire and a swinging contact 19 operated by a handle 20 supported on the plate 11 positioned to be readily operated by the thumb of the user when the machine is held in one hand. The switch for the light 13 is also arranged to be opened by the handle 20 when it is moved to the stop position, so that the motor will be stopped and the light cut off simultaneously.

The film enters the compartment 2 through a slot 21 in the rear wall of the housing and thence passes over the top of the sprocket into the upper loop portion or lobe, of the compartment, thence across the front wall of the compartment in which the aperture 8 is located, thence through the lower loop compartment and under the beater arm 22 which constitutes the intermittent feeding device for the film, the operation of which will be later described. After passing the beater arm the film is fed out of the machine by the sprocket wheel, through the engagement of teeth on its lower side with the perforations of the film, the film passing out through a slot 23 in the rear wall of the casing 1 immediately below the slot 21.

The construction and operation of the beater are illustrated in Figs. 7, 8 and 9. The beater comprises a loop of wire having its side arms 24 spaced to engage the margins of the film and with its connecting portion bent up as shown so as not to rub against the picture-bearing part of the film. The arms 24 are curved to conform to the shape of the wall of the lower loop compartment against which the film is pressed by the beater on its downward movement. The beater is supported for pivotal movement on a pin 25 fixed in the plate 11 and is actuated by means of pins 26 set in the face of the sprocket 7, one pin being provided for four teeth of the sprocket when standard film is used, so that the beater will be actuated once for each picture of the film. The pins 26 engage a rearward extension 27 of the adjacent arm 24. The movement of the pin against the arm 27 serves to raise the beater against the tension of its operating spring 28 which, as shown, consists of a coiled spring wound around the pin 25 and engaging one of the side arms 24. By this arrangement the downward movement of the beater occupies but a very short interval of the total cycle of operation.

This rapid movement of the film is permissible by reason of the fact that the machine employs no tension guides at the aperture to maintain the picture stationary during the interval of projection. Instead the film compartment 2 is so shaped into lobes that the inherent elasticity of the film serves to maintain the film pressed against the aperture without other retaining means being necessary, although we prefer to use, for greater accuracy of registration, a film-positioning pin or tooth 30 set in the wall of the compartment 2 above the aperture and positioned to engage one of the holes in the film when the picture is in accurate alignment with the aperture. This pin 30 is tapered like a tooth of the sprocket wheel 7 and is of the proper dimensions at its base to fit the sprocket hole when the film is pressed against the aperture. The pin 30 does not add to the resistance of the film in being fed through the machine, for the reason that the feeding forward of the upper loop of film by the feed sprocket 7 causes the film to be released from the pin just before the intermittent movement takes place, and the movement of the film as effected by the beater is so rapid that the intermediate holes in the film do not engage with the tooth, but when the film comes substantially to rest at the completion of the movement the elasticity of the film as it is fed forward by the sprocket 7 causes the sprocket hole to engage the pin and hold the film against movement until the beater is about to be released by the next succeeding pin 26 of the sprocket wheel.

Fig. 8 shows in dotted lines the relative positions of the film loops and beater just after the conclusion of the intermittent movement, and in dot-and-dash lines shows the beater and film in an intermediate position while the picture is stationary at the aperture. Fig. 9 shows in dotted lines the position of the film loops and beater just before the intermittent movement begins and shows in dot-and-dash lines the positions of the film loops and beater at an intermediate point in the downward movement of the beater. It will be noted from Fig. 8 that the beater has brought the lower loop of film down against the compartment wall and the natural elasticity of the film has caused it to press out against the front wall, thus filling the lower loop compartment. This motion of the film has caused one of the sprocket holes to come to rest beside the pin 30, and as the forward movement of the upper part of the film continues under the action of the sprocket 7, the film is forced over the pin in the manner shown in dot-and-dashed lines. The film remains stationary in this position during the time the picture is projected on the screen and while the beater is being elevated by the engagement of the pin 26 with the arm 27. During this period the lower loop of film is taken up by the action of the sprocket 7 feeding the film out of the machine by the teeth on its lower side and the upper loop is increased in size by the action of the sprocket in feeding the film into the machine, as appears from Fig. 8 which shows in dot-and-dash lines the relative positions of the two loops of film and the beater at an intermediate point in the interval that the picture is stationary at the aperture. It will be noted that as the beater is elevated its front edge is moved toward the wall of the film compartment, thus preventing the film being drawn away from the aperture by the feed sprocket.

Fig. 9 shows in dotted lines the relative positions of the film loops and the beater just as the beater is about to be released and the intermittent movement of the film effected. It will be noted that the upper loop of the film has increased in size until it fills the upper portion of the compartment 2 and has begun to buckle slightly under the thrust from the sprocket. The walls of the compartment are so shaped that the buckling of the film effected by the thrust of the sprocket takes place at the location of the tooth 30 and thereby causes the film to disengage itself from the tooth before the downward movement of the beater begins. The film is thus entirely free when engaged and fed forward by the beater and may therefore be advanced much more rapidly without injury to the film than when the usual friction guides are employed.

In dot-and-dash lines in Fig. 9 the positions of the film loop and beater are shown at an intermediate point in the downward movement of the film as effected by the beater. The rapid downward movement of the film causes the film to be drawn away from the front wall of the film compartment and thus prevents the tooth 30 from engaging in the holes of the film and causing it to be torn. After the beater comes to rest the elasticity of the film and the forward movement of the upper part of the film causes it to again engage against the wall of the film compartment at the aperture and also causes the sprocket holes to engage with the pin 30, thereby accurately registering the picture with the aperture.

The moving picture machine of this application may be used with advantage for advertising purposes and for commercial demonstrations wherein a short length of film with its ends connected into a continuous loop is repeatedly projected. In such use no reels are employed. The machine may, however, also be used for the projection of more extended lengths of film and for this purpose we have provided a reel attachment that can be folded down against the top of the machine when not in use and which, when opened up, provides support for two reels of film and a driving connection for the take-up reel. This attachment is shown in Figs. 1 and 2 and comprises a sheet metal bracket 40 pivoted on the cover 41 of the gear compartment and also supported by a pin or screw 42 working in a slot in the bracket which permits a movement of 90° of the bracket from the closed position shown in Fig. 2 to the open position shown in Fig. 1. The bracket is provided with bearings or spindles 43 and 44 for the two film reels, the spindle 43 for the lower or take-up reel being provided with a grooved belt pulley 45 whereby the take-up reel may be driven from a belt pulley 46 supported on the shaft of the sprocket 7.

The operation of the machine is sufficiently described in the foregoing specification to be readily understood. The mechanism disclosed in the drawings constitutes the preferred embodiment of the invention, but it may be obviously altered in various particulars without departing from the essentials of the invention. We have described and shown a shutter such as usually employed in projecting apparatus, but the use of this shutter is not essential as the movement of the film is so rapid as to be scarcely discernible. The omission of the shutter has the advantage of permitting the use of a projecting light of less intensity due to the fact that the light is at no time cut off from the screen.

The machine as shown is adapted to be held in the hand while the picture is being projected, but we may obviously provide a base or stand for the machine so that it may be used in the usual manner. Also the machine may, if desired, be enclosed in a case after the manner of the so-called suitcase type machines with a light opening arranged so that the projection may be accomplished without removing the machine from the case.

We claim:

1. In a motion picture projecting machine, the combination of a film-guiding member containing an aperture through which the picture is projected and a film-feeding mechanism for feeding the film intermittently across said aperture, said feed mechanism and film-guiding member being arranged to so shape the film that the inherent elasticity of the film maintains the film stationary with regard to the aperture during the intervals between said intermittent movement, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

2. In a motion picture projecting machine, the combination of a film-guiding member having an aperture, means for continuously feeding the film toward and away from said aperture, means for intermittently feeding said film across said aperture, said feed mechanism and film-guiding member being arranged so that the inherent elasticity of the film maintains the film in engagement with the film-guiding member and stationary with regard to the aperture during the intervals between said intermittent movement, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

3. In a motion picture projecting machine, the combination of a film compartment, one wall of said compartment containing the projection aperture, means for intermittently feeding the film across said aperture, said wall being shaped and arranged with respect to said feed mechanism and said film in such a manner that the film is forced to conform to said wall, thereby maintaining said film stationary at the aperture during the intervals between said intermittent movement, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

4. In a motion picture projecting machine, the combination of a film compartment, one wall of said compartment containing the projecting aperture, means for continuously feeding the film toward said wall at one side of said aperture and away from said wall at the other side thereof, and means for intermittently feeding the film across said aperture, said wall being shaped and arranged with respect to said feed mechanism and said film in such a manner that the film is forced to conform to said wall, thereby maintaining said film stationary at the aperture during the intervals between said intermittent movement, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

5. In a motion picture projecting machine, the combination of a member containing an aperture through which the picture is projected and a film feeding mechanism for feeding the film intermittently across said aperture, said member being shaped to form a concave loop of the film to hold it in engagement therewith, and said feed mechanism being spaced from said aperture a distance sufficient to provide said concave loop, so that the inherent elasticity of the film maintains the film stationary with regard to the aperture during the intervals between said intermittent movement, and means located at said aperture for causing the successive pictures on said film to register accurately with said aperture, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

6. In a motion picture projecting machine, the combination of a member containing an aperture through which the picture is projected and a film feeding mechanism for feeding the film intermittently across said aperture, said member being shaped to form a concave loop of the film to thereby hold it in engagement therewith, and said feed mechanism being spaced from said aperture a distance sufficient to provide said concave loop, so that the inherent elasticity of the film maintains the film stationary with regard to the aperture during the intervals between said intermittent movement, and means located at said aperture for causing the successive pictures on said film to register accurately with said aperture, said means comprising a pin or tooth adapted to engage a hole in said film when said picture comes to rest, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

7. In a motion picture projecting machine, the combination of a film compartment, one wall of said compartment containing the projection aperture, means for continuously feeding the film toward said wall at one side of said aperture and away from said wall at the other side thereof, and means for intermittently feeding the film across said aperture, said wall being shaped to form a concave loop of the film to thereby hold it in engagement therewith, and said feed mechanism being spaced from said aperture a distance sufficient to provide said concave loop, so as to maintain said film stationary at the aperture during the intervals between said intermittent movement, a pin or tooth adjacent said aperture for accurately registering the pictures on the film with said aperture, and means cooperating with said feeding means for causing the film to disengage said pin in advance of said intermittent movement, said feeding mechanism comprising a case, a cavity in said case, lateral recesses in the cavity, a toothed disc therein, studs on said disc, a hoop adapted to be struck by said studs, and a spring for lowering said hoop to produce said intermittent motion.

8. In a moving picture machine, a film compartment having a projection wall, a film inlet, a film outlet, a film-gate, means for entraining the film therethrough in continuous movement, means for giving the entrained film an intermittent feeding motion, and means for enabling the inherent elasticity of the film to aid the movement of the pictures intermittently past said film-gate, comprising an inward curve on said projection wall near its medial portion.

9. In a motion picture machine of the class described, a film compartment for guiding the film through the machine, said compartment having a projection aperture therein, means in said compartment for feeding said film with an intermittent movement to project the pictures, and means for enabling the inherent elasticity of the film to aid the pictures to move intermittently past said aperture, comprising a solid formation projecting inwardly from the wall of said compartment at said aperture, an outward formation of the wall of said compartment above said aperture, and an outward formation of the wall of said compartment below said aperture.

10. In a motion picture machine of the class described, a film compartment for guiding the film through the machine, said compartment having a projection aperture therein, means in said compartment for feeding said film with an intermittent movement, and means for enabling the inherent elasticity of the film to cause the film to move intermittently past said film-gate comprising an inward formation of the wall of said compartment at said aperture to hold the film stationary thereby, the wall of said compartment above said aperture being shaped to form a hollow lobe thereat, the wall of said compartment below said aperture being shaped to form another lobe thereat.

11. In a motion picture projector of the class described, a film compartment for guiding the film into and out of the machine and having a wall including a projection aperture and a wall including a film inlet and a film outlet, means for entraining the film therethrough in continuous movement, and means for enabling the inherent elasticity of the film to aid in giving the pictures an intermittent movement past said aperture, including an outward formation of the wall above said aperture to receive the continuously progressing film, an inward formation of the wall at said aperture to hold said film over said aperture during the intervals of projection, and an outward formation of said wall below said aperture to receive the progressed film, and a beater actuated in synchronism with the release of said film from said aperture by the continuous feeding thereof.

12. In a motion picture projecting machine, the combination of a member containing a projection aperture, and a film-feeder for feeding the film against the face of said member, said member being bent inwardly at the point of contact of the film therewith, said feeder and said aperture-containing member being so spaced apart longitudinally, relatively to that length of the film at which said film will begin to bend, that the inherent elasticity of the shape the film is forced into alone holds the film stationary against said aperture during the projection intervals.

13. In a motion picture machine, the combination of a member having an aperture, means for continuously feeding the film toward said aperture, and means for intermittently feeding said continuously advanced film across said aperture, comprising an upper lobe in said member, an inward formation of the medial portion of said member, a lower lobe in said member, and a beater operated by said feeder in synchronism with the projection interval.

14. In a motion picture machine, the combination of a compartment enclosing the film within the machine, one wall of said compartment containing the projection aperture, and means for intermittently feeding the film across said aperture, comprising a continuous film feeder in said compartment, an inward formation of said wall at said aperture for receiving the film progressed by said feeder, a hollow outward formation of said wall above said aperture for permitting the resiliency of said progressed portion to hold the lower part of the progressing portion stationary at said aperture, and means for removing the projected portion of the film from the aperture when the upper formation is filled with film.

15. In a motion picture machine, the combination of a compartment enclosing the film within the machine, one wall of said compartment containing the projection aperture, means for continuously feeding the film toward said wall at one side of said aperture and away from said wall at the other side thereof, an inward formation of said wall at said aperture for receiving the film progressed by said feeder, a hollow outward formation of said wall above said aperture for permitting the resiliency of said progressing portion to hold the progressed portion stationary at said aperture, and means for removing the projected portion of the film from the aperture when the upper formation is filled with film.

16. In a motion picture projector of the class described, a film compartment for guiding the film into and out of the machine and having a wall including a projection aperture, and a wall including a film inlet and a film outlet, means for entraining the film therethrough in continuous movement, and means for giving the film an intermittent movement past said aperture, including a formation of the projection aperture wall to receive the progressing film, an inward formation of said wall to hold said film over said aperture during the intervals of projection, and a hollow outward formation of said wall to receive the progressed film, a beater actuated in synchronism with the release of said film from said aperture by the continuous feeding thereof, and means in the formation at the aperture for registering successive pictures in alignment with said aperture.

17. In a motion picture projector of the class described, a film compartment for guiding the film into and out of the machine and having a wall including a projection aperture, a wall including a film inlet and a film outlet, means for entraining the film therethrough in continuous movement, and means for giving the film an intermittent movement past said aperture, including a hollow outward formation of the wall to receive the progressing film, an inward formation of the wall to hold said film over said aperture during the intervals of projection, a hollow outward formation of said wall to receive the progressed film, and a beater actuated in synchronism with the release of said film from said aperture by the continuous feeding thereof, an inwardly projecting member on the inward formation at said aperture for registering the successive pictures in alignment with said aperture, and means actuated by said continuous feeder for disengaging the film therefrom in advance of said intermittent movement.

18. In a motion picture machine of the class described, a film compartment, one wall thereof having a projection aperture, and a device in said compartment for giving the film a continuous movement into and out of the compartment and for giving it an intermittent motion past said aperture, comprising a wall of said compartment having a film inlet and outlet therein, two other walls having opposite lateral recesses therein, a member fitting in the cavity formed thereby, said member having formations on one surface for feeding the film continuously into and out of the compartment, other formations on another surface of said member, another member associated with said second formations and with said film, and means on said second member for lowering said member to move the film intermittently past said aperture.

In testimony whereof we affix our signatures.

ARMANDO PAPÖ.
AUGUSTO GENTILINI.